W. T. COULSON.
CONSTRUCTION OF ILLUMINATING DEVICES.
APPLICATION FILED APR. 11, 1919.
1,348,698.
Patented Aug. 3, 1920.
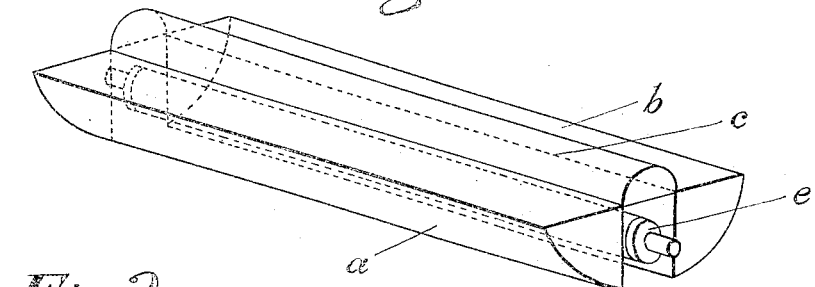
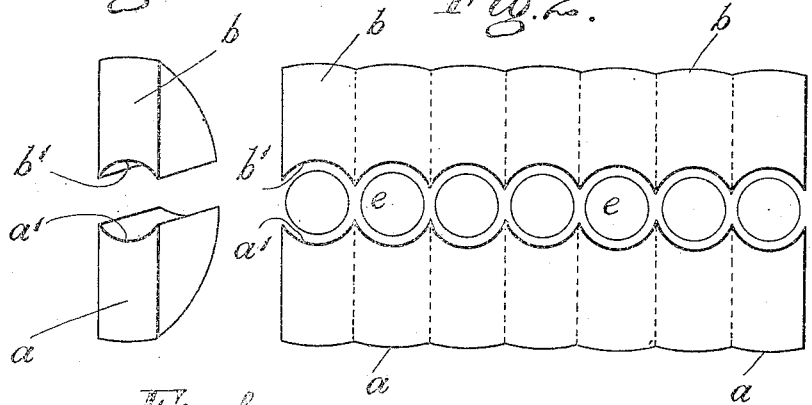
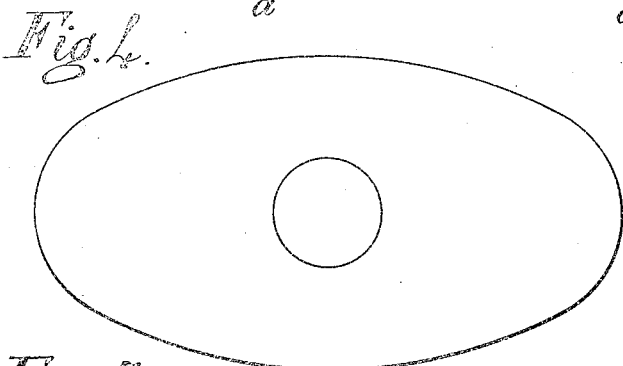
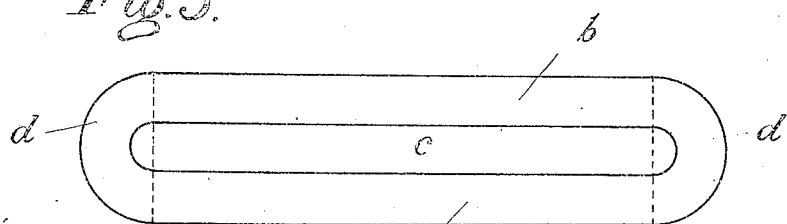
Witnesses:
Inventor
William T. Coulson

UNITED STATES PATENT OFFICE.

WILLIAM THOMAS COULSON, OF ANERLEY, LONDON, ENGLAND.

CONSTRUCTION OF ILLUMINATING DEVICES.

1,348,698.      Specification of Letters Patent.      Patented Aug. 3, 1920.

Application filed April 11, 1919. Serial No. 289,360.

*To all whom it may concern:*

Be it known that I, WILLIAM THOMAS COULSON, a subject of the King of Great Britain, residing at Anerley, London, England, have invented certain new and useful Improvements in Construction of Illuminating Devices, of which the following is a specification.

The object of this invention is to construct in an improved manner a device of any desired length for illuminating rooms, shop windows, pictures and other places or objects, the device being also applicable for marine and other lighting, the object being to produce a fan shaped beam of light by reflection from the internal surface of glass prisms.

For the purpose of my invention I construct a prism or lens in one or a number of pieces of any desired shape, and of a length much greater than its width and having holes or a slot along its length in which is fitted and positioned the source of light whereby full advantage may be taken of the reflective properties of the prism or lens so that, by positioning such a complete device in say the cornice or cornices of a room or the like or along the inside front top portion of a shop window, the room or the like or the window will be illuminated with a diffused or refractive light directed fan shape, between the ceiling and the wall of the room or shop window, thus avoiding any direct illumination of the room or shop window.

The device may be constructed in a variety of ways, and as will be understood from the examples shown on the annexed drawings in which Figure 1 is a perspective view of one form of my invention.

Fig. 2 is a bottom plan of a slightly modified form of the invention in which a series of bulbs is substituted for the continuous bulb shown in Fig. 1.

Fig. 3 is a perspective view of one of the sections of Fig. 2.

Fig. 4 is a modification showing an oval shape recess for receiving the bulb or source of light.

Fig. 5 is a top plan view of the completed illuminating device showing the strip of glass and the end lenses.

The illuminating device as illustrated in Fig. 1 is composed of three pieces of properly shaped glass $a$, $b$, $c$, the transverse section of the assembled pieces being similar to that disclosed in a section of a lens made by a plane containing the optical axis as described and shown in the specification and drawings of my United States Patent No. 1,081,215, dated December 9, 1913, with the addition of the half round strip of glass $c$ connecting the flat sides of the two pieces $a$, $b$. These pieces of glass $a$, $b$, $c$, are preferably much longer than their width but may be of any suitable length and the ends may be completed by half lenses $d$, $d$ of the same section, as shown in Fig. 5, and these half lenses may be circular or oval in construction.

The glass strips $a$, $b$, $c$ may each be in one piece or formed of separate pieces cemented or held together by other suitable means.

The illuminant is preferably in the form of a festoon bulb $e$ extending the whole length of the two major prisms $a$, $b$ but of course the filament could be made to afford much more light than that usually given by a bulb of this pattern and might consist of a closely wound spiral or helix extending the whole length of the bulb to secure this result. Several lengths of these prisms could be employed with their ends adjacent and their axes parallel.

It will also be understood that I may employ several more or less spherical bulbs instead of the long tubular bulb $e$ before mentioned and the third piece of glass $c$ might also be varied in form consisting of several bull's-eye lenses instead of a half round piece or cylinder as in the first device.

Instead of constructing the pieces $a$, $b$ as shown in Fig. 1, I may provide the inner walls of the pieces $a$, $b$, with recesses continuous along their length, the recesses receiving an electric bulb, as at Figs. 2 and 3.

The device may also be constructed of separate segments $a$, $b$, having recesses $a'$, $b'$, respectively, (see Fig. 3) corresponding segments being secured together by cement in order to form the device illustrated in Fig. 2. An electric bulb $e$ is positioned in the recesses $a'$, $b'$ of the opposite segments $a$, $b$ and the device may be made more complete by the addition of the half lenses as shown in Fig. 5.

I may also employ oval shaped lenses as illustrated in plan in Fig. 4 and in which of curves disclosed by two planes containing the optical axis and at right angles to each other, the one is calculated to afford parallel rays and the other to cause divergent rays.

The curved reflecting surfaces of the glass in all patterns would be similar to the curves of the corresponding reflectors except that in the former cases allowance must be made for the effect of refraction in the glass.

The tubular bulb could of course be used in the second described example or a row of spherical bulbs in the first described construction.

The invention would be suitable among other things for the starboard and port lights of ships and for illuminating shop windows and pictures and I may employ a reflective medium applied to or positioned behind the lens.

What I do claim as my invention and desire to secure by Letters Patent, is:—

1. An illuminating device consisting of a lens of a length much greater than its width, such lens consisting of a plurality of sections secured together having alining recesses along its length adapted to receive the sources of light.

2. An illuminating device comprising spaced prisms of a combined length much greater than their width, said prisms consisting of a plurality of recessed sections, means for securing said sections together so that said recesses are in longitudinal alinement, sources of light positioned in said recesses, and a semi-cylindrical strip of glass connecting said prisms.

3. An illuminating device comprising spaced lenses of a combined length much greater than their width, said lenses consisting of a plurality of recessed sections, means for securing said sections together so that said recesses are in longitudinal alinement, sources of light positioned in said recesses, a semi-cylindrical strip of glass connecting said lenses and a half lens inclosing each end of said spaced lenses.

4. An illuminating device comprising spaced lenses of a combined length much greater than their width, said lenses consisting of a plurality of sections having oval shaped recesses, means for securing said sections together so that the major axes of said recesses are in longitudinal alinement, sources of light positioned in said recesses, and a semi-cylindrical strip of glass connecting said lenses.

5. An illuminating device comprising spaced prisms of a length much greater than their width, a lens connecting said prisms and a source of light positioned in the space between said prisms and adjacent said lens.

In testimony whereof I have hereunto set my hand in presence of two subscribing witnesses.

WILLIAM THOMAS COULSON.

Witnesses:
  WM. O. BROWN,
  F. QUADRAS.